March 18, 1952     R. N. STEELE     2,589,976
FISHHOOK REMOVER
Filed April 7, 1949
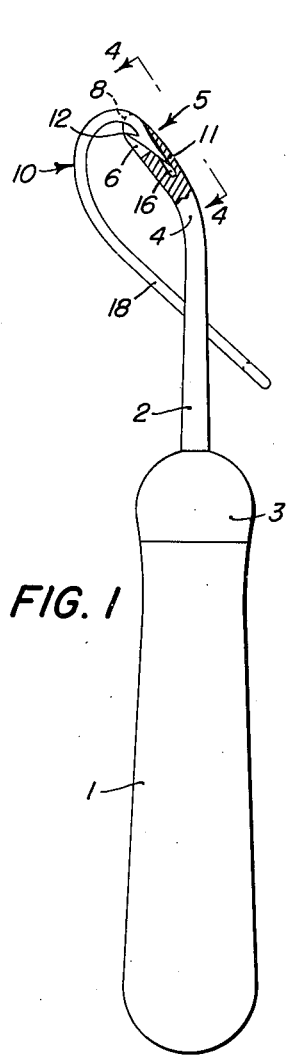
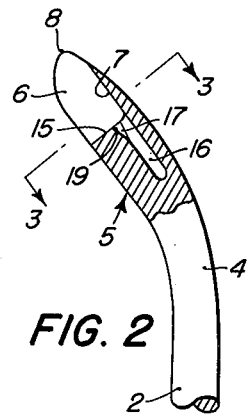
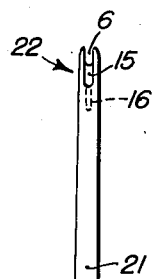
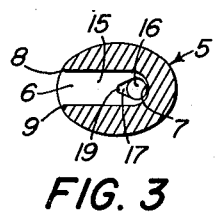
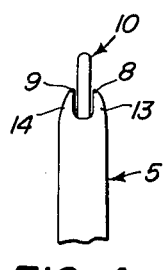
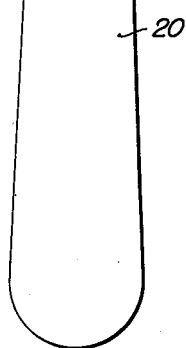
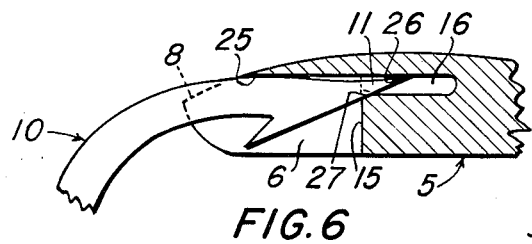
INVENTOR.
RAY N. STEELE
BY
Merrill M. Blackburn
ATTORNEY Patented Mar. 18, 1952

2,589,976

UNITED STATES PATENT OFFICE 2,589,976

FISHHOOK REMOVER

Ray N. Steele, Cedar Rapids, Iowa

Application April 7, 1949, Serial No. 85,951

11 Claims. (Cl. 43—53.5)

This invention relates to a fish hook remover as a handy tool for use by sportsmen or by fishermen in general for extracting a hook that has found its way into the gullet of a fish or into any position requiring the use of a tool to conveniently bring about the release of a fish hook without danger of injury to the hands.

Most fish are normally caught with the hook in a position wherein the shank thereof is in alignment with the fish line to thus place the hook pointing in the direction of the person fishing. The result is that for most instances the hook is taken by a fish in the same position described and when caught the point of the hook will be toward the mouth opening of the fish.

It is one of the main objects therefore of the present invention to provide a fish hook removing tool which is adapted to bring about the disgorging of the hook by application directly to the point of the lodged hook. And since most hooks are positioned with the point toward the mouth opening of the fish, this tool has considerable merit in performing its designated function. The use of the tool is not limited, however, to any particular position of the hook to bring about the extraction thereof, but its design is most efficient for the usual cases requiring such hook removal.

Another object of the fish hook remover is to provide a substantial handle terminating in an elongated slender hook engaging tool whereby a good grip is provided and the slender tool has good probing qualities with efficient hook finding and engaging attributes.

Some further objects of the fish hook remover include the means embodied into the tool to prevent rotation of the hook after engagement by the tool; the cooperative means used to shield the hook point and hook barb after the hook end is picked up by the tool; and the cooperative means provided in the tool end which act to socket and releasably grasp the hook point structure to hold the same while the tool is manipulated to disgorge the hook from the flesh of the fish's mouth.

All other objects and advantages inherent in the fish hook remover of the instant construction shall hereinafter appear in the following detailed description thereof having reference to the accompanying drawing forming a part of this specification.

In the drawings:

Fig. 1 is a side elevational view of the fish hook remover with the end portion of the tool broken away and in section to illustrate the relation of the tool when in fish hook engaging position;

Fig. 2 is an enlarged fragmentary portion of the tool end as shown in Fig. 1, but with the hook omitted to better show certain details of construction of the tool head;

Fig. 3 is a cross sectional view of the tool head as taken along the line 3—3 in Fig. 2, but on a still larger scale;

Fig. 4 is a rear view of a fragmentary portion of the tool head as viewed along the line 4—4 in Fig. 1;

Fig. 5 is a side elevational view of a fish hook remover having a modified tool structure using a straight shank and head in contrast to the angle end shank shown in Figs. 1 to 4; and Fig. 6 is an enlarged fragmentary sectional view similar to Fig. 1, showing in particular the points of contact between the tool and the barbed end of the fishhook held therein.

The fish hook remover of this invention has two main elements comprising a handle 1 to which is secured the tool 2 in any conventional way to prevent relative rotation between the tool and handle, and a suitable cap 3 is used to finish off the tool end of the handle.

Tool 2 is made as a long slender straight shank curved at 4 to provide a head 5 that is angularly disposed with respect to the shank axis. The head 5 is also slender in construction although slightly enlarged in the axis disposed in the hook receiving plane as best shown in Fig. 3.

A slot 6 is formed in the end of head 5 along a medial plane thereof which plane is common to the angular axis of the head and the axis of the shank 3 thereby placing the slot 6 in the normal hook receiving position as best depicted in Fig. 1. The slot 6 does not cut completely through the head end thus leaving a wall 7 which ends short of the tip of the head.

The tip of the head terminates in two spaced points or wall sections 8 and 9 formed by the introduction of slot 6, but it should be noted that these two points are located in positions adjacent the round wire body of the hook 10 just in advance of where the hook is deformed to provide the hook point 11 and the hook barb 12 as best seen in Fig. 1. Since the head end points are rounded off as shown at 13 and 14 in Fig. 4, the two points are shielded from catching fish flesh or bones when a hook is socketed in the head to thereby prevent interference while removing the hook from a fish.

Slot 6 ends intermediate the length of the head in a ledge or shoulder 15 and a small diameter hole or opening 16 is drilled from the ledge 15 longitudinally of the head 5 and substantially in line with the wall 7 for the purpose of receiving the point 11 of the fish hook 10. In addition, a tapered recess 17 is also provided at the open end of the hole 16 opening laterally outwardly of the notch or slot 6 with respect to the head, and obviously with its wide end opening into the ledge 15 of notch 6, thereby forming a tapered seat.

After locating the point of a hook, the tool is applied to the end thereof as shown in Fig. 1, which places the hook shank 18 alongside the slender shank of the tool 2, thus disposing the general plane of the hook 10 substantially in the plane of the slot 6 in head 5. Pressure of the tool in the direction of the hook point 11 will wedge the hook in tightly socketed relation within the head 5 of the tool 2 by the three point contact established by the outer end of wall 7, which engages the hook 10 at a point 25, as shown in Fig. 6, opposite the barb 12, the wall of hole 16, which, as shown in Fig. 3, is slightly smaller than the width of the slot 6, against the point 11 of the hook 10, which engages the latter at a point indicated at 26, and by the contact of the tapered edge 19 of the recess or slot 17 against the hook at a point indicated at 27, intermediate the outermost end of the point 11 and barb 12 as best shown in Fig. 1. This holding action of the hook 10 by the head 5 is supplemented by the natural spring inherent in the hook metal which will tend to slightly bend the hook point 11 while the latter is protected and confined in the hole 15 during hook removal.

By advantageously manipulating the handle 1 of the tool 2, the hook is readily extracted from the fish which action is also aided by the angular shank head allowing greater swinging of the handle of the tool relative to the fish mouth opening in most normal conditions of use.

Fig. 5 shows a fish hook remover wherein the handle 20 receives a straight shank 21 terminating in a head 22 which is disposed on the same axis as the shank 21. Otherwise the head 22 is constructed in the same way as is the head 5 having identical parts. This form of tool has its advantages under certain conditions of use wherein the bent shank tool may not be used with equal facility.

As above indicated, both tools have the same head, but when either is used to contact the hook 10, the latter is socketed in a position to place the common flat sides of the hook point and barb between the side walls of the slot 6. The side walls of the slot 6 will counteract rotation of the hook during the manipulation of the tool and obviously will be so held as long as the hook is retained by the grasping surfaces described forming integral parts of the open end of the tool head 5 or 22. This feature adds considerably to the ease and timely removal of a hook from a fish and enhances the general usefulness of the fish hook remover comprising the present invention.

Although the above description has been more specifically directed to the forms of fish hook remover disclosed in the drawings, certain changes and modifications may be made in the described construction without departure from the fundamental concept of this invention. The extent and nature of such deviations in structure shall, however, be governed by the breadth and scope of the appended claims directed to this invention.

What I claim is:

1. A fishhook remover comprising an elongated member having a head at one end with a pair of side walls spaced apart to receive a barbed end of a fishhook therebetween, an upper wall joining said side walls and terminating short of the outer ends of said side walls, and a shouldered portion at the inner ends of said side walls, there being an opening in the head extending inwardly from the shouldered portion, said opening being adapted to receive the point of said barbed end when a portion of said barb engages said shouldered portion, said shoulder portion having a tapered recess adjacent the mouth of said opening to receive the edge of the hook at the barbed side thereof.

2. A fishhook remover as defined by claim 1 in which the axis of said opening lies adjacent said top wall and the barb-receiving tapered recess is at the side of said opening opposite said top wall.

3. A fishhook remover comprising a tool terminating in a head, said head having a socket to receive the barbed end and point of a hook therein, said socket having one wall thereof arranged to engage the hook between the barb and the point of the hook, and an approximately opposite wall spaced from said one wall and having a greater longitudinal extent than said one wall so as to engage the hook at said point of the hook and at a point approximately opposite the barb, whereby the barb end of the hook may be tightly wedged into said socket.

4. A fishhook remover comprising a tool terminating in an elongated head, said head having a slot therein with an opening formed into said head from said slot, said opening extending substantially longitudinally of the head and adapted to receive and surround said point, said slot and opening being adapted to receive the barb and point of the hook, respectively, and said head having a wall portion adjacent the outer end of said opening arranged to contact the hook between the point and barb to hold said hook in place within the aforesaid slot and opening.

5. A fishhook remover comprising a tool having a head, said head having a slot therein to receive the barbed end of a fishhook, said head also having a hole leading from said slot for the reception of the point of a hook, and a recess formed in the head between said slot and the hole, said barbed end of the hook, when engaged by said head, being snugly socketed with the barb thereof in said recess, the point of the hook extending into the hole, and said head having a wall portion of said slot engaging the opposite edge of the barbed end of the hook to tighten the grasp of the barbed end of the hook.

6. A fishhook remover comprising an elongated shank having a recess in the end thereof for the reception of one portion of the barbed end of the fishhook against one wall of said recess, and a ledge formed opposite said wall to contact another portion of said barbed end of the hook, said ledge being shaped to provide a tapered seat to frictionally hold the end of the hook within said recess and against the aforesaid wall thereof.

7. A fishhook removing tool comprising a shank, a head at the end thereof, and said head having a recess formed therein for the reception of the barbed end of a fishhook, one wall of said recess having spaced portions adapted to engage on outer curved edge of the barbed end portion of the hook at two points of contact spaced longitudinally of said barbed end portion, and another wall of said recess being arranged to frictionally contact and grasp said hook at the opposite edge of said barbed end portion at a location intermediate the aforesaid two points of contact.

8. A fishhook remover comprising a tool including a head, said head having spaced walls at the tip thereof adapted to receive a fishhook therebetween, said head having a longitudinally extending recess between said spaced walls and extending therefrom inwardly of said head for the reception of the barbed end of a fishhook, and cooperative means to clamp said barbed end and hold the hook in said recess, whereby the curved portion of the hook adjacent the barbed end extends outwardly from between said spaced walls so as to prevent the latter from catching into fish flesh while manipulating the tool.

9. A fishhook removing tool comprising a shank and an integral head at one end thereof, said head having a pair of laterally spaced apart wall sections, and an opening extending inwardly of the head from the space between said wall sections and adapted to receive and surround the point of the barbed end of a fishhook with the barb lying outside said opening, and an upper wall joining the laterally spaced apart wall sections for a portion of their length and lying above said barb when a fishhook is engaged by said tool.

10. A fishhook remover comprising an elongated slender member having one end thereof cleft longitudinally and having a recess shaped to receive and substantially surround the pointed end of a fishhook, said member having barb-engaging portions serving as a stabilizing unit to hold the hook against rotation.

11. A fishhook remover having a fishhook receiving head comprising a pair of spaced-apart side walls, and a top wall joining said side walls, said head having a ledge portion joining said side and top walls and an opening extending inwardly thereof through said ledge portion.

RAY N. STEELE.

REFERENCES CITED

The following references are of record in the file of this patent:

UNITED STATES PATENTS

| Number | Name | Date |
|---|---|---|
| 253,363 | Foard | Feb. 7, 1882 |
| 400,112 | Post | Mar. 26, 1889 |
| 2,050,194 | Pflueger | Aug. 4, 1936 |
| 2,445,620 | Ketland | July 20, 1948 |